No. 884,096. PATENTED APR. 7, 1908.
J. N. LEACH.
WATER RELIEF VALVE FOR ENGINE CYLINDERS.
APPLICATION FILED AUG. 24, 1907.
2 SHEETS—SHEET 1.
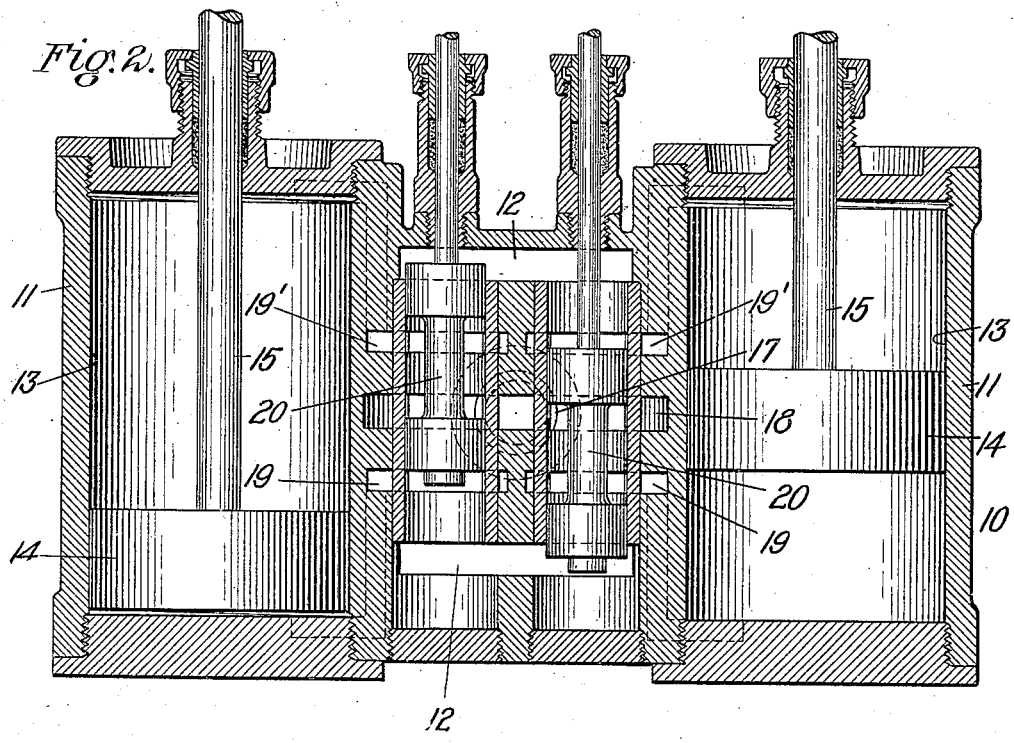
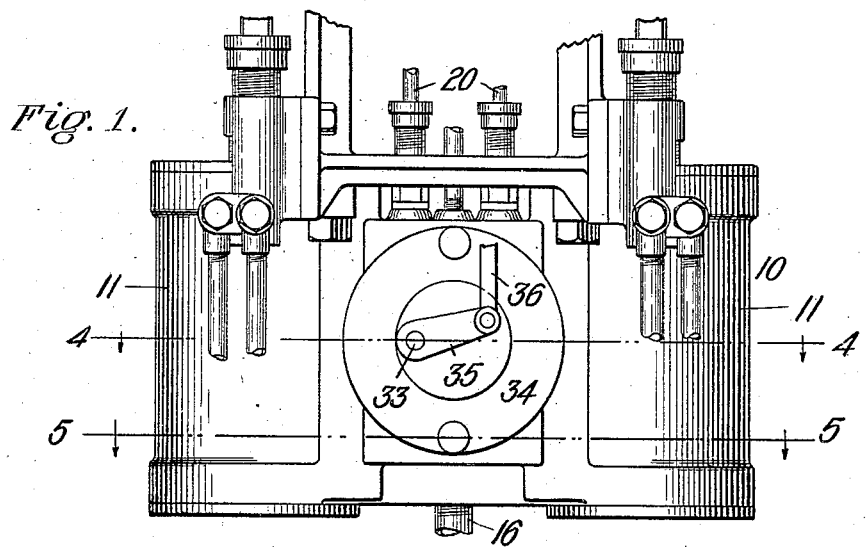
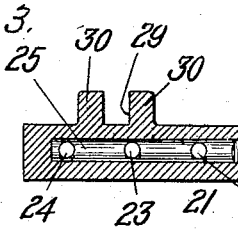
Witnesses:
Inventor:
John N. Leach
by his attorney No. 884,096.
PATENTED APR. 7, 1908.
J. N. LEACH.
WATER RELIEF VALVE FOR ENGINE CYLINDERS.
APPLICATION FILED AUG. 24, 1907.
2 SHEETS—SHEET 2.
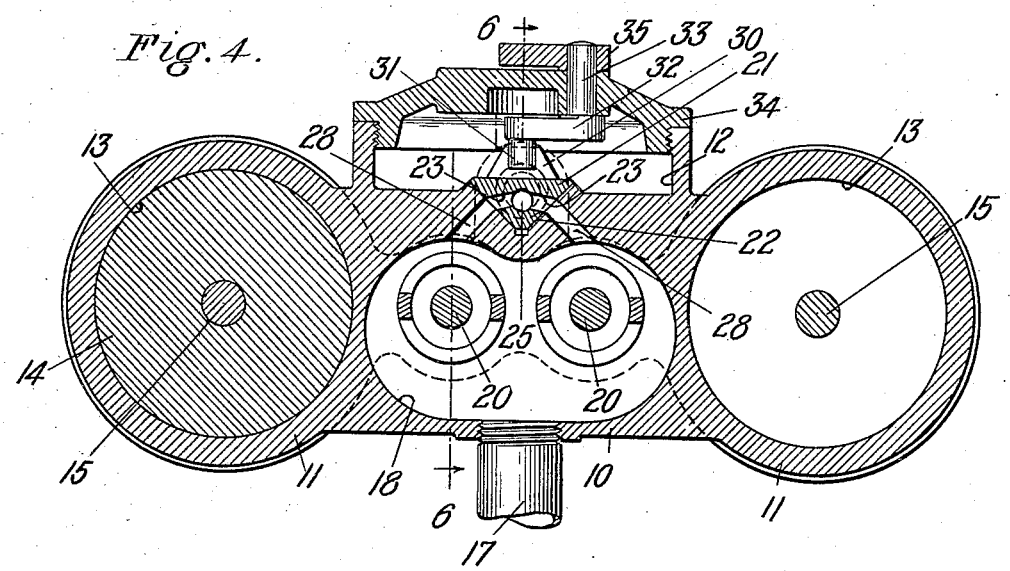
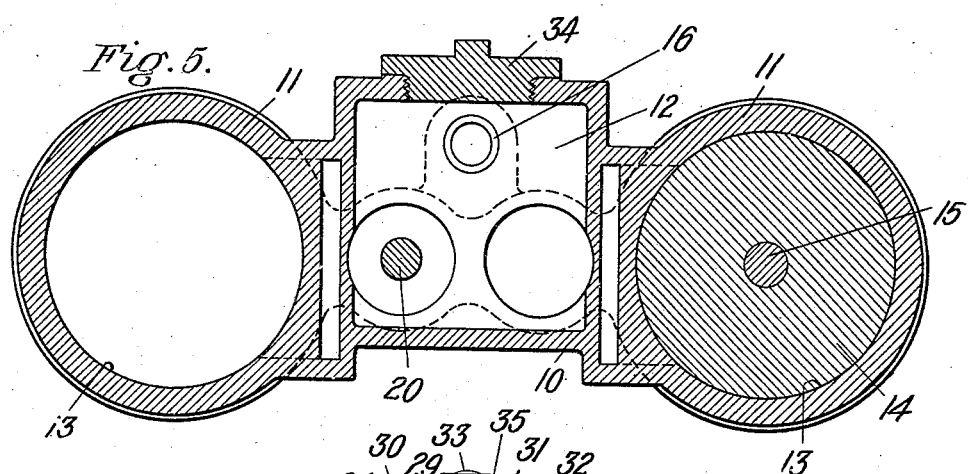
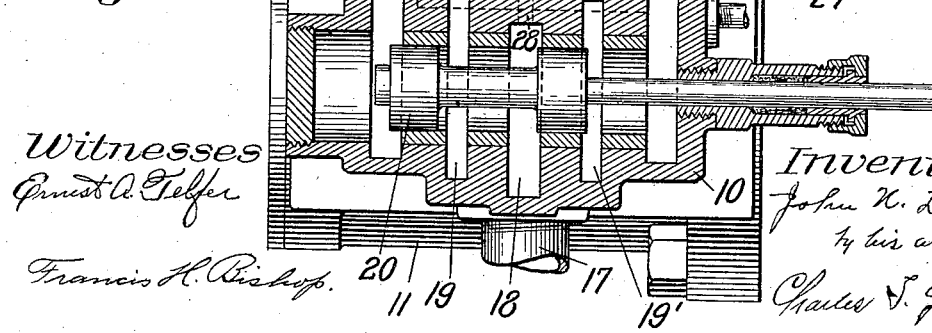
Witnesses
Ernest A. Telfer
Francis H. Bishop.
Inventor:
John N. Leach
by his attorney,
Charles S. Gooding.

UNITED STATES PATENT OFFICE.

JOHN N. LEACH, OF MELROSE, MASSACHUSETTS, ASSIGNOR TO JUDSON L. THOMSON M'F'G COMPANY, A CORPORATION OF MAINE.

WATER RELIEF-VALVE FOR ENGINE-CYLINDERS.

No. 884,096.      Specification of Letters Patent.      Patented April 7, 1908.

Application filed August 24, 1907. Serial No. 390,036.

*To all whom it may concern:*

Be it known that I, JOHN N. LEACH, a citizen of the United States, residing at Melrose, in the county of Middlesex and State of Massachusetts, have invented new and useful Improvements in Water Relief-Valves for Engine-Cylinders, of which the following is a specification.

This invention relates to improvements in water relief valves for cylinders of steam engines, and the object is to provide a relief valve which may be opened to relieve the cylinder of the water of condensation and thus prevent damage to the engine.

The invention consists in the combination and arrangement of parts set forth in the following specification and particularly pointed out in the appended claims.

Referring to the drawings: Figure 1 is a plan of the cylinders of an engine embodying my invention, the frame, piston rods and valve stems being broken away to save space. Fig. 2 is an enlarged horizontal plan section of the same taken in a plane containing the median lines of the piston rods and valve stems. Fig. 3 is a detail longitudinal section of the relief valve. Fig. 4 is an enlarged sectional elevation taken on line 4—4 of Fig. 1. Fig. 5 is an enlarged sectional elevation taken on line 5—5 of Fig. 1. Fig. 6 is an enlarged sectional elevation taken on line 6—6 of Fig. 1.

Like numerals refer to like parts throughout the several views of the drawings.

In the drawings, 10 is a cylinder casting comprising two cylinders 11, 11 and provided with a steam chest 12. Within the cylinders 11, 11 are piston spaces 13, 13 in which are located pistons 14, 14, respectively, having piston rods 15, 15. A steam supply pipe 16 furnishes steam to the steam chest 12, while an exhaust pipe 17 is connected to an exhaust port 18. The piston spaces 13, 13 are connected to the steam chest 12 by steam ports 19, 19 and 19', 19'. Two slidable piston valves 20, 20, are adapted to control the admission of the live steam to the piston spaces 13, 13 and release the exhaust steam into the exhaust port 18 in the usual and well known manner.

A relief valve 21, which is preferably V-shaped in cross section, rests in and is adapted to reciprocate in a V-shaped groove or seat 22 formed in the cylinder casting 10. The valve 21 is provided with transverse passages 23, 24, and 24' which are intersected by a longitudinal passage 25, there being a plug 26, which, for convenience of manufacture, closes the passage 25 at one end. When the valve 21 is in the position shown in the drawings, the passage 24 registers with two passages 27 leading to the ports 19, 19, respectively; the passage 24' registers with two passages 27' which lead to the ports 19', 19', respectively, and the passage 23 registers with two passages 28, 28 which lead to the exhaust port 18.

The valve 21 is provided with a transverse slot 29 located between two ears 30, 30, there being a crank-pin 31 located in said slot, said crank-pin being fast to a crank-arm 32 which, in turn, is fast to a rock-shaft 33. The rock-shaft 33 is journaled in a steam chest cover 34 which is preferably screwed into the cylinder casting 10. An arm 35 fast to the rock-shaft 33 on the exterior of the steam chest cover 34 is connected to a link 36 which may be connected to any suitable device for rocking the rock-shaft 33 on its axis and thereby moving the valve 21 in the direction of its length.

The general operation of the valve is as follows: In starting an engine there is always more or less water of condensation in the cylinders and the operator by rocking the crank-arm 32 on its axis moves the valve 21 into the position shown in the drawings, with its transverse passages registering with the corresponding passages in the cylinder casting 10, so that when steam is admitted to the steam chest 12 and the engine starts to operate, the water of condensation is forced by the pistons 14 and by the steam pressure through the steam ports 19, 19 and 19', 19', through the passages 27, 27 and 27', 27', through the passages 24, 24 and 24', 24' into the passage 25 and from thence through the passage 23' and passages 28, 28 to the exhaust port 18 and from thence said water flows outwardly through the exhaust pipe 17. As soon as the cylinders have become freed of the water, the operator then rocks the crank-arm 32 in the opposite direction, thereby moving the valve 21 toward the left (Fig. 6)

so that its transverse passages are out of alinement with the corresponding passages in the cylinder casting 10.

It will be seen that under normal conditions the pressure of the steam within the steam chest 12 holds the valve 21 on its seat 22, but if the operator should neglect to open the relief valve the water will force it slightly from its seat and said water will find its way along the seat 22 and it will pass outwardly into the exhaust port 18.

Having thus described my invention, what I claim and desire by Letters Patent to secure is:

1. In a steam engine, a cylinder provided with a steam chest, a piston space, two steam ports leading from said steam chest to said piston space and an exhaust port; a relief valve adapted to be moved into position to open communication from said exhaust port to both of said steam ports simultaneously, and means for moving said valve to open and close connection from said exhaust port to said steam ports.

2. In a steam engine, a cylinder provided with a steam chest, a piston space, two steam ports leading from said steam chest to said piston space, and an exhaust port; a relief valve adapted to be moved into position to open communication from said exhaust port to both of said steam ports simultaneously, said valve being arranged to be held against its seat by the steam pressure, and means for moving said valve to open and close communication from said exhaust port to said steam ports.

3. In a steam engine, a cylinder provided with a steam chest, a piston space, two steam ports leading from said steam chest to said piston space, and an exhaust port; a relief valve adapted to be moved into position to open communication from said exhaust port to both of said steam ports simultaneously; and means for moving said valve into position to close communication from said exhaust port to said steam ports.

4. In a steam engine, a cylinder provided with a steam chest, a piston space, two steam ports leading from said steam chest to said piston space, and an exhaust port; a relief valve located in said steam chest and adapted to be moved into position to open communication from said exhaust port to both of said steam ports simultaneously, said valve being arranged to be held against its seat by the steam pressure, and means for moving said valve to open and close communication from said exhaust port to said steam ports.

5. In a steam engine, a cylinder provided with a steam chest, a piston space, two steam ports leading from said steam chest to said piston space, and an exhaust port; a slidable relief valve adapted to be moved into position to open communication from said exhaust port to both of said steam ports simultaneously; and means for sliding said valve into position to close communication from said exhaust port to said steam ports.

6. In a steam engine, a cylinder provided with a steam chest, a piston space, two steam ports leading from said steam chest to said piston space, and an exhaust port; a slidable relief valve adapted to be moved into position to open communication from said exhaust port to both of said steam ports simultaneously; a pivoted arm located within said steam chest and operatively connected to said valve, and means connected to said arm whereby said valve may be moved to open and close communication from said exhaust port to said steam ports.

7. In a steam engine, a cylinder provided with a steam chest, a piston space, two steam ports leading from said steam chest to said piston space, and an exhaust port; a steam chest cover; a slidable relief valve adapted to be moved into position to open communication from said exhaust port to both of said steam ports simultaneously; a rock-shaft journaled in said cover and extending therethrough; and an arm fast to said rock-shaft and operatively connected to said valve.

8. In a steam engine, a cylinder provided with a steam chest, a piston space, two steam ports leading from said steam chest to said piston space, and an exhaust port; a steam chest cover having screw-threaded engagement with said cylinder; a relief valve adapted to be moved into position to open communication from said exhaust port to both of said steam ports simultaneously, and means for moving said valve to open and close communication from said exhaust port to said steam ports.

9. In a steam engine, a cylinder provided with a steam chest, a piston space, two steam ports leading from said steam chest to said piston space, and an exhaust port; a steam chest cover; a slidable relief valve adapted to be moved into position to open communication from said exhaust port to both of said steam ports simultaneously, said valve being located in said steam chest and provided with a transverse slot; a rock-shaft journaled in said cover and extending therethrough; and an arm fast to said rock-shaft and provided with a pin located in said slot.

10. In a steam engine, a cylinder provided with a steam chest, a piston space, two steam ports leading from said steam chest to said piston space, and an exhaust port; a steam chest cover; a slidable relief valve provided with three passages adapted to register respectively with said steam ports and said exhaust port simultaneously, said valve being provided with a passage connecting said three passages, and means for moving said valve whereby said passages may be moved into and out of alinement with said ports.

11. In a steam engine, two cylinders provided with a common steam chest, two piston spaces, four steam ports leading from the ends, respectively, of said piston spaces to said steam chest, and an exhaust port; a relief valve adapted to be moved into position to open communication from said exhaust port to all of said steam ports simultaneously, and means for moving said valve to open and close communication from said exhaust port to said steam ports.

12. In a steam engine, two cylinders provided with a common steam chest, two piston spaces, four steam ports leading from the ends, respectively, of said piston spaces to said steam chest, and an exhaust port; a relief valve adapted to be moved into position to open communication from said exhaust port to all of said steam ports simultaneously, said valve being arranged to be held against its seat by the steam pressure, and means for moving said valve to open and close communication from said exhaust port to said steam ports.

13. In a steam engine, two cylinders provided with a common steam chest, two piston spaces, four steam ports leading from the ends, respectively, of said piston spaces to said steam chest, and an exhaust port; a slidable relief valve adapted to be moved into position to open communication from said exhaust port to all of said steam ports simultaueously, and means for moving said valve to open and close communication from said exhaust port to said steam ports.

14. In a steam engine, two cylinders provided with a common steam chest, two piston spaces, four steam ports leading from the ends, respectively, of piston spaces to said steam chest, and an exhaust port; a slidable relief valve adapted to be moved into position to open communication from said exhaust port to all of said steam ports said simultaneously, said valve being arranged to be held against its seat by the pressure of the steam, and means for moving said valve to open and close communication from said exhaust port to said steam ports.

15. In a steam engine, two cylinders provided with a common steam chest, two piston spaces, four steam ports leading from the ends, respectively, of said piston spaces to said steam chest, and an exhaust port; a slidable relief valve adapted to be moved into position to open communication from said exhaust port to all of said steam ports simultaneously, means for sliding said valve into position to close communication from said exhaust port to said steam ports.

16. In a steam engine, two cylinders provided with a common steam chest, two piston spaces, four steam ports leading from the ends, respectively, of said piston spaces to said steam chest, and an exhaust port; a slidable valve adapted to be moved into position to open communication from said exhaust port to all of said steam ports simultaneously; a pivoted arm located within said steam chest and operatively connected to said valve and means connected to said arm whereby said valve may be moved to open and close communication from said exhaust port to said steam ports.

17. In a steam engine, two cylinders provided with a common steam chest, two piston spaces, four steam ports leading from the ends, respectively of said piston spaces to said steam chest, and an exhaust port; a slidable relief valve provided with passages, adapted to register, respectively, with said ports, said valve being provided also with a passage connecting said first named passage and means for moving said valve to open and close communication from said exhaust port to said steam ports.

18. In a steam engine, two cylinders provided with a common steam chest, two piston spaces, four steam ports leading from the ends, respectively, of said piston spaces to said steam chest, and an exhaust port; a slidable relief valve provided with passages adapted to register, respectively, with said ports, said valve being provided also with a passage connecting said first named passages; a pivoted arm located in said steam chest and operatively connected to said valve, and means for moving said valve to open and close communication from said exhaust port to said steam ports.

19. In a steam engine, two cylinders provided with a common steam chest, two piston spaces, four steam ports leading from the ends, respectively, of said piston spaces to said steam chest and an exhaust port; and a relief valve adapted to be moved into position to open communication from said exhaust port to all of said steam ports simultaneously, said valve being V-shaped in cross section and said steam chest having a V-shaped groove or seat in which said valve rests.

20. In a steam engine, a cylinder provided with a steam chest, a piston space, two steam ports leading from said steam chest to said piston space, and an exhaust port; a valve adapted to be moved to open communication from said steam ports alternately to said exhaust port and from said steam chest to said steam ports alternately; a relief valve; and means to move said relief valve into position to open communication from one of said steam ports to said exhaust port.

21. In a steam engine, a cylinder provided with a steam chest, a piston space, a steam port leading from said steam chest to said piston space, and an exhaust port; a valve adapted to be moved to open communication from said steam port to said steam chest and said exhaust port alternately; a relief valve; and means to move said relief valve into position to open communication from said steam port to said exhaust port.

In testimony whereof I have hereunto set my hand in presence of two subscribing witnesses.

JOHN N. LEACH.

Witnesses:
CHARLES S. GOODING,
SADIE V. MCCARTHY.